US009599885B2

(12) United States Patent
Narikawa

(10) Patent No.: US 9,599,885 B2
(45) Date of Patent: Mar. 21, 2017

(54) DRIVING APPARATUS, LIGHT SOURCE DRIVING APPARATUS, LIGHT SOURCE APPARATUS, PROJECTION APPARATUS, AND DRIVING METHOD, SUITABLE FOR DRIVING LOAD IN WHICH VALUE OF PHYSICAL QUANTITY AS CONTROLLED OBJECT PERIODICALLY CHANGES

(71) Applicant: CASIO COMPUTER CO., LTD., Shibuya-ku, Tokyo (JP)

(72) Inventor: Tetsuro Narikawa, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 41 days.

(21) Appl. No.: 14/661,980

(22) Filed: Mar. 18, 2015

(65) Prior Publication Data

US 2015/0268544 A1 Sep. 24, 2015

(30) Foreign Application Priority Data

Mar. 19, 2014 (JP) .................................. 2014-056439

(51) Int. Cl.
G03B 21/20 (2006.01)
H04N 5/74 (2006.01)
H05B 37/02 (2006.01)
H04N 9/31 (2006.01)

(52) U.S. Cl.
CPC ......... *G03B 21/2053* (2013.01); *G03B 21/20* (2013.01); *H04N 5/74* (2013.01); *H04N 9/31* (2013.01); *H05B 37/02* (2013.01)

(58) Field of Classification Search
CPC ...... G03B 21/2053; G03B 21/20; H04N 5/74; H04N 9/31; H05B 37/02
See application file for complete search history.

(56) References Cited

U.S. PATENT DOCUMENTS

2014/0063468 A1* 3/2014 Narikawa ............ H04N 9/3111
353/31

FOREIGN PATENT DOCUMENTS

JP 2008234842 A 10/2008

\* cited by examiner

*Primary Examiner* — Sultan Chowdhury
*Assistant Examiner* — Magda Cruz
(74) *Attorney, Agent, or Firm* — Holtz, Holtz & Volek PC

(57) ABSTRACT

A driving apparatus drives a load so as to periodically change a physical quantity as a controlled object. The apparatus includes a calculation unit configured to calculate a deviation between the targeted value and a detection value detected by the detection unit, a storage unit configured to store past deviations calculated by the calculation unit, a determination unit configured to determine a manipulative variable corresponding to the physical quantity, by referring to a past deviation before a predetermined period, which has been stored in the storage unit, and a driving unit configured to drive the load, based on the manipulative variable determined by the determination unit.

18 Claims, 10 Drawing Sheets

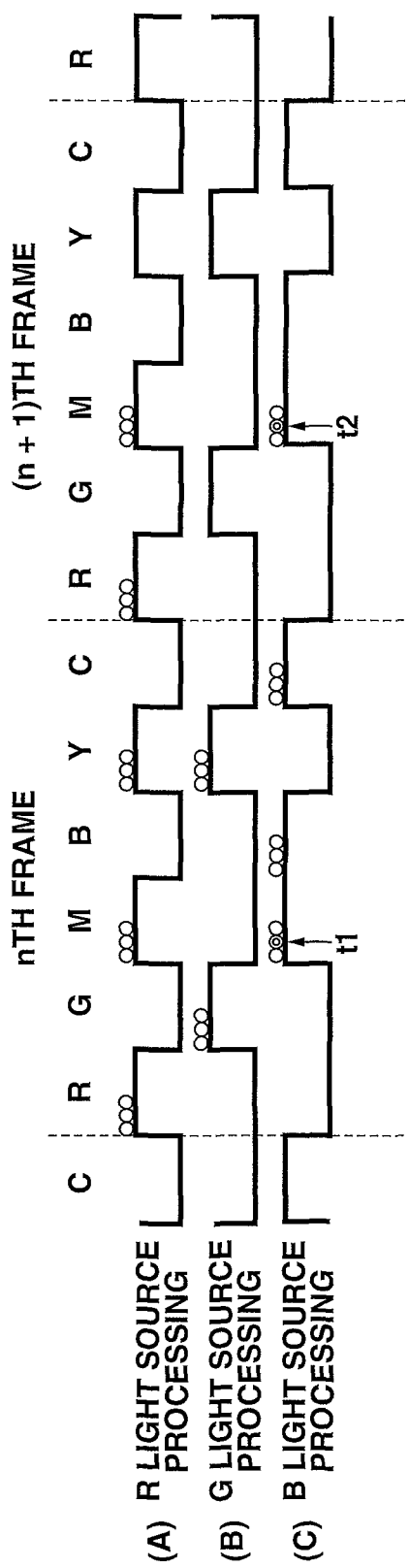

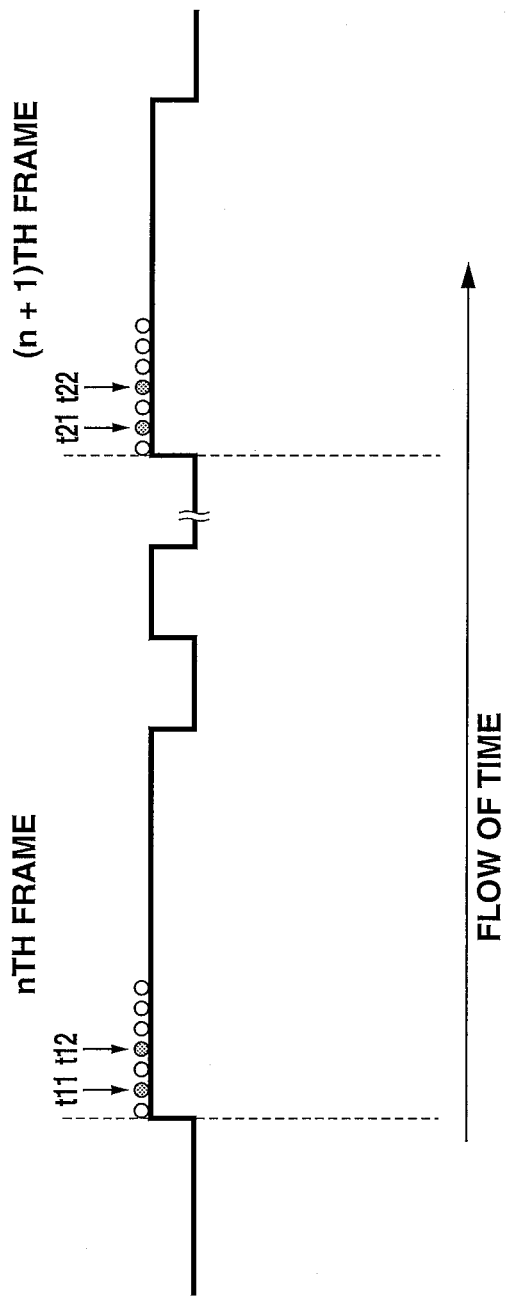

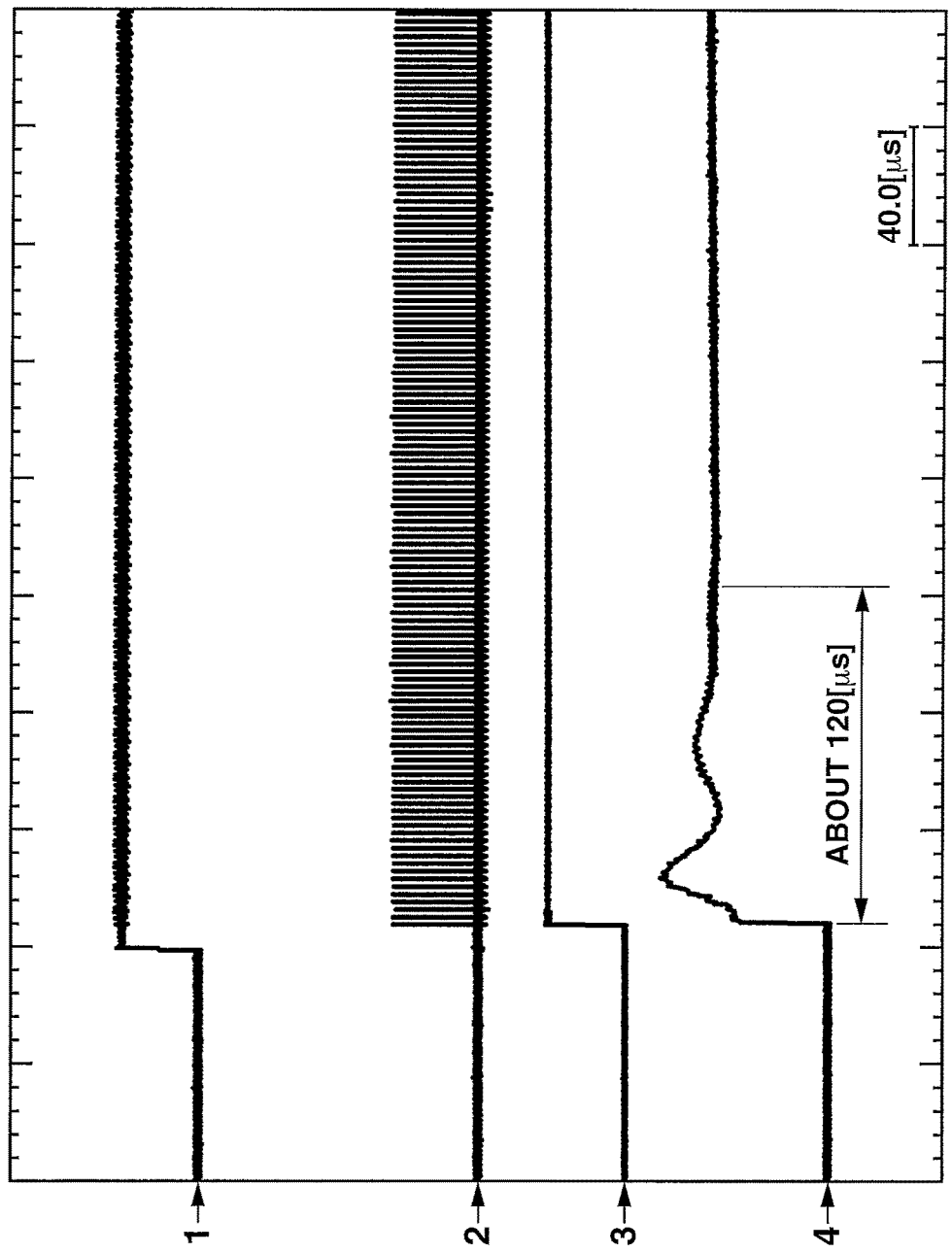

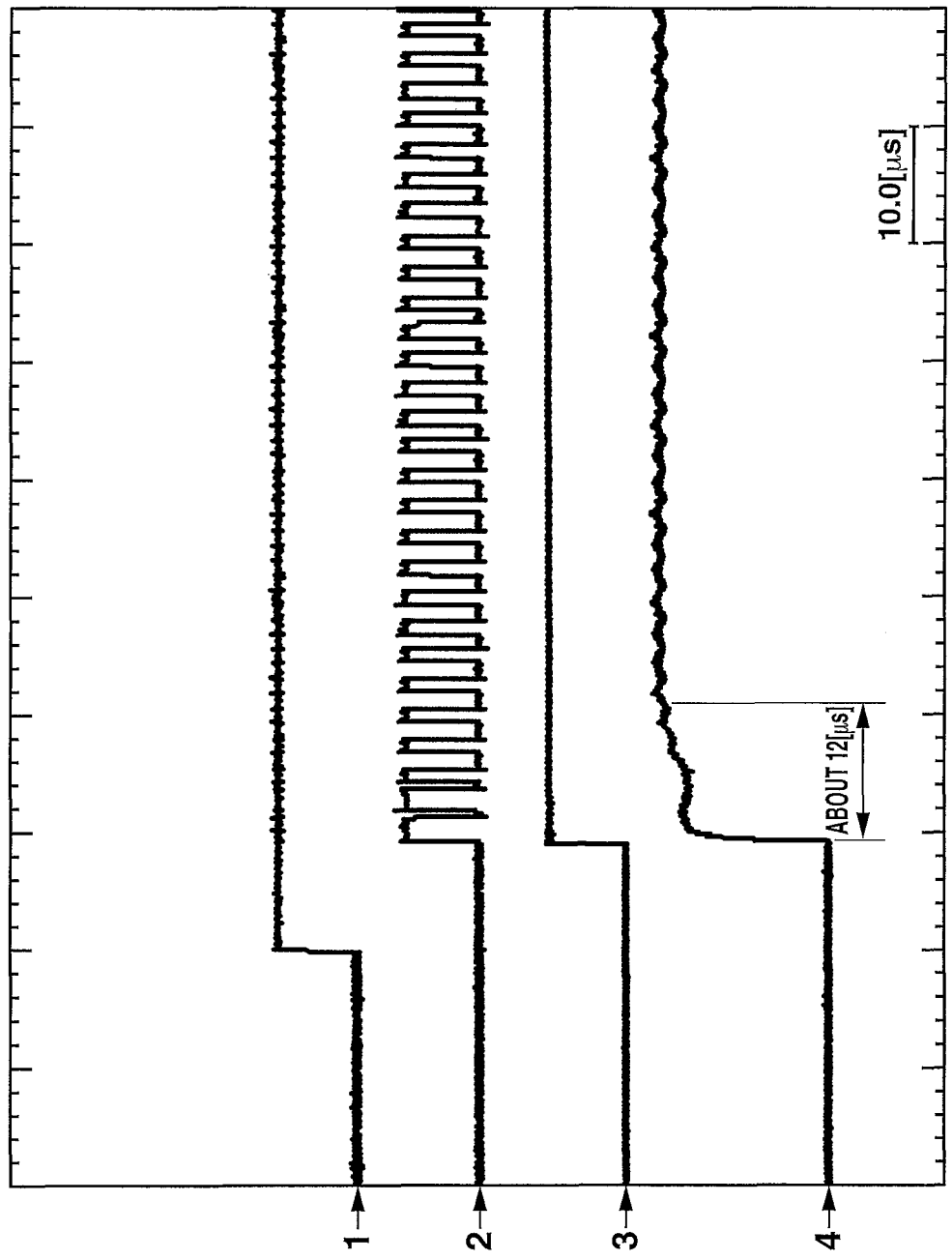

DRIVING APPARATUS, LIGHT SOURCE DRIVING APPARATUS, LIGHT SOURCE APPARATUS, PROJECTION APPARATUS, AND DRIVING METHOD, SUITABLE FOR DRIVING LOAD IN WHICH VALUE OF PHYSICAL QUANTITY AS CONTROLLED OBJECT PERIODICALLY CHANGES

CROSS-REFERENCE TO RELATED APPLICATIONS

This application is based upon and claims the benefit of priority from Japanese Patent Application No. 2014-056439, filed Mar. 19, 2014, the entire contents of which are incorporated herein by reference.

BACKGROUND OF THE INVENTION

1. Field of the Invention

The present invention relates to a driving apparatus, a light source driving apparatus, a light source apparatus, a projection apparatus, and a driving method, suitable for driving a load in which the value of a physical quantity as a controlled object periodically changes.

2. Description of the Related Art

A projection apparatus of a time division (field sequential) scheme projects a color picture by sequentially and repeatedly irradiating display elements with red light, green light, and blue light. There is considered a technique of using three types of light-emitting diodes (LEDs) as light sources which emit the respective primary color light beams described above and sequentially and repeatedly lighting the LEDs using an output from one DC/DC converter by a switching unit. In this case, according to Jpn. Pat. Appln. KOKAI Publication No. 2008-234842, since the LEDs of the respective colors differ in drive voltage, the DC/DC converter changes a drive voltage in synchronism with the start of lighting of each LED.

An output from an AC/DC converter is supplied to the above DC/DC converter. Since the output voltage of the DC/DC converter does not become stable unless the output voltage of the AC/DC converter becomes stable, it is conceivable to incorporate a stabilization circuit in the AC/DC converter. If the stabilization circuit incorporated in the AC/DC converter is of a switching scheme, it is preferable, for the purpose of reducing the number of components, to control the stabilization circuit and the DC/DC converter by using one controller. When the stabilization circuit and the DC/DC converter are controlled by one controller in this manner, in particular, as the output voltage of the DC/DC converter changes, a response delay tends to occur in the output voltage of the stabilization circuit from the viewpoint of a control cycle. For this reason, when the output voltage of the DC/DC converter changes because of the switching ON/OFF of the load, the pulsation (glitch) in the output voltage of the stabilization circuit increases. With this increase in pulsation, the pulsation in the output voltage of the DC/DC converter undesirably increases.

The present invention has been made in consideration to the above situation. It is an object of the present invention to provide a driving apparatus which can reduce the pulsation generated as a physical quantity as a controlled object periodically changes, a light source driving apparatus, a light source apparatus, a projection apparatus, and a driving method.

SUMMARY OF THE INVENTION

According to one aspect of the present invention, there is provided a driving apparatus which drives a load so as to periodically change a physical quantity as a controlled object, the apparatus comprising: a setting unit configured to set a targeted value of the physical quantity; a detection unit configured to detect a present value of the physical quantity; a calculation unit configured to calculate a deviation between the targeted value and a detection value detected by the detection unit; a storage unit configured to store past deviations calculated by the calculation unit; a determination unit configured to determine a manipulative variable corresponding to the physical quantity, by referring to a past deviation before a predetermined period, which has been stored in the storage unit; and a driving unit configured to drive the load, based on the manipulative variable determined by the determination unit.

According to another aspect of the present invention, there is provided a light source driving apparatus which drives a light source element so as to periodically change a value of a physical quantity as a controlled object, the apparatus comprising: a setting unit configured to set a targeted value of the physical quantity; a detection unit configured to detect a present value of the physical quantity; a calculation unit configured to calculate a deviation between the targeted value and a detection value detected by the detection unit; a storage unit configured to store past deviations calculated by the calculation unit; a determination unit configured to determine a manipulative variable corresponding to the physical quantity, by referring to a past deviation before a predetermined period, which has been stored in the storage unit; and a driving unit configured to drive the light source element based on the manipulative variable determined by the determination unit.

According to still another aspect of the present invention, there is provided a light source apparatus comprising: a light-emitting element driven so as to periodically change a value of a physical quantity as a controlled object; a setting unit configured to set a targeted value of the physical quantity; a detection unit configured to detect a present value of the physical quantity; a calculation unit configured to calculate a deviation between the targeted value and a detection value detected by the detection unit; a storage unit configured to store past deviations calculated by the calculation unit; a determination unit configured to determine a manipulative variable corresponding to the physical quantity, by referring to a past deviation before a predetermined period, which has been stored in the storage unit; and a driving unit configured to drive the light-emitting element based on the manipulative variable determined by the determination unit.

According to still another aspect of the present invention, there is provided a projection apparatus comprising: a light-emitting element configured to be driven so as to periodically change a value of a physical quantity as a controlled object to be supplied; a setting unit configured to set a targeted value of the physical quantity; a detection unit configured to detect a present value of the physical quantity; a calculation unit configured to calculate a deviation between the targeted value and a detection value detected by the detection unit; a storage unit configured to store past deviations calculated by the calculation unit; a determination unit configured to determine a manipulative variable corresponding to the physical quantity, by referring to a past deviation before a predetermined period, which has been stored in the storage unit; a driving unit configured to drive the light-emitting element based on the manipulative variable determined by the determination unit; an input unit configured to input an image signal; a display element configured to display an image based on an image signal input by the input unit and form an optical image by using emitted light from the light-emitting element; and a projection unit configured to project the optical image formed by the display element onto a target on which projection is to be performed.

According to still another aspect of the present invention, there is provided a driving method of driving a load so as to periodically change a physical quantity as a controlled object, the method comprising: setting a targeted value of the physical quantity; detecting a present value of the physical quantity; calculating a deviation between the targeted value and a detection value obtained in the detection; storing past deviations calculated in the calculation; determining a manipulative variable corresponding to the physical quantity, by referring to a past deviation before a predetermined period, which has been stored in the storing; and driving the load, based on the manipulative variable determined in the determination.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 8 is a timing chart showing, in a simplified form, processing by the DSP over a plurality of frames according to the first embodiment;

FIG. 9 is a timing chart showing the basic concept of the above feedback control according to the first embodiment;

FIG. 10 is a timing chart exemplarily showing the drive current waveform of an LED without learning according to the first embodiment; and FIG. 11 is a timing chart exemplarily showing the drive current waveform of an LED with learning according to the first embodiment.

DETAILED DESCRIPTION OF THE INVENTION

An embodiment of the present invention will be described below with reference to the accompanying drawing. Although technically preferable limitations for carrying out the present invention are imposed on the embodiment described below, the scope of the present invention is not limited to the following embodiment and the illustrated examples.

An embodiment in which the present invention is applied to a projector apparatus of a DLP® scheme will be described with reference to the accompanying drawing.

Figure 1:
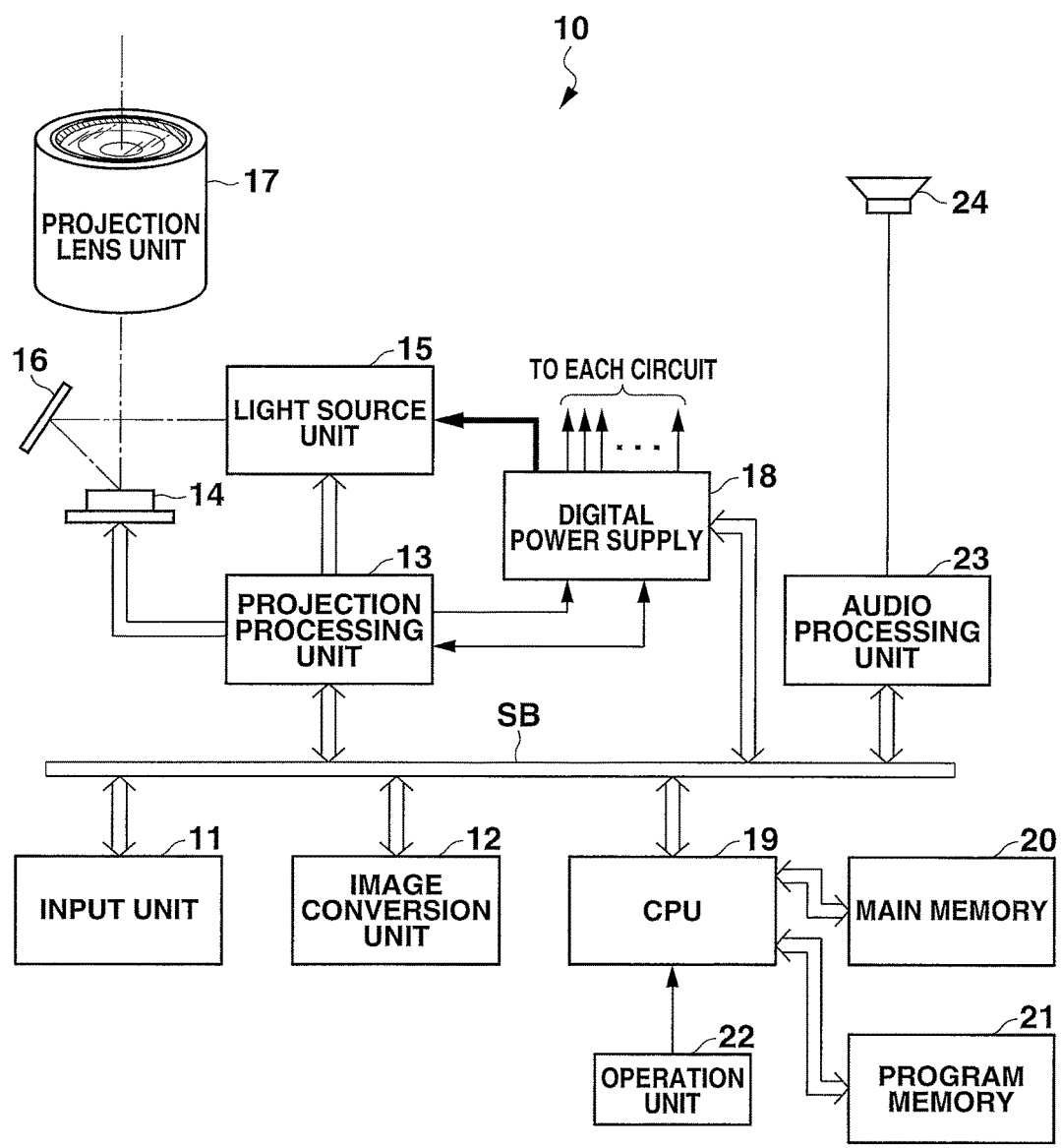
FIG. 1 is a block diagram showing the functional circuit arrangement of a projector apparatus according to a first embodiment of the present invention.

FIG. 1 is a block diagram showing the schematic functional arrangement of a projector apparatus 10 according to this embodiment. Referring to FIG. 1, an input unit 11 is constituted by, for example, a video input terminal of a pin jack (RCA) type, an RGB input terminal of a D-sub15 type, a high-definition multimedia interface (HDMI®) terminal, and the like. Analog or digital image signals based on various types of standards which are input to the input unit 11 are digitized by the input unit 11 as needed, and the resultant signals are sent to an image conversion unit 12 via a system bus SB.

The image conversion unit 12 is also generally called a scaler or formatter. The image conversion unit 12 uniformly converts image data of input digital values into image data in a predetermined format suitable for projection, and sends the data to a projection processing unit 13.

At this time, the image conversion unit 12 also superimposes data such as symbols indicating various types of operation states for on screen display (OSD) on the image data as needed, and sends the image data after superimposition to the projection processing unit 13.

The projection processing unit 13 drives a micromirror element 14 as a spatial optical modulation element to display an image by higher time-division driving implemented by multiplying a frame rate complying with a predetermined format, for example, 120 frame/sec, the division number of color components, and the number of display tone levels in accordance with the sent image data.

The micromirror element 14 displays an image by quickly turning on/off the inclination angles of a plurality of micromirrors arranged in an array, for example, WXGA (Wide eXtended Graphic Array) (1280 pixels (horizontal)×800 pixels (vertical)), thereby forming an optical image using the reflected light.

On the other hand, a light source unit 15 cyclically emits primary color light beams of red (R), green (G), and blue (B) and complementary color light beams of yellow (Ye), magenta (Mg), and cyan (Cy) in a predetermined order in a time-divisional manner. Primary color light or complementary color light from the light source unit 15 is totally reflected by a mirror 16 to irradiate the micromirror element 14.

An optical image is then formed by the light reflected by the micromirror element 14. The formed optical image is projected/displayed on a screen (not shown) on which projection is to be performed via a projection lens unit 17 on which the optical image is formed.

Assume that the light source unit 15 includes, as light-emitting elements, a light-emitting diode (LED) which emits red light, an LED which emits green light, and an LED which emits blue light.

The projection processing unit 13 forms an optical image by displaying an image on the micromirror element 14 and causes each LED as a light-emitting element in the light source unit 15 to emit light under the control of a CPU 19 (to be described later). On the other hand, the projection processing unit 13 transmits a segment switching timing pulse to a digital power supply 18 and transmits/receives a command signal for power supply control to/from the digital power supply 18.

The digital power supply 18 generates and supplies many DC voltage values necessary for the respective circuits from an AC power supply provided for the projector apparatus 10, and also supplies power necessary to drive the LEDs to the light source unit 15.

Figure 2:
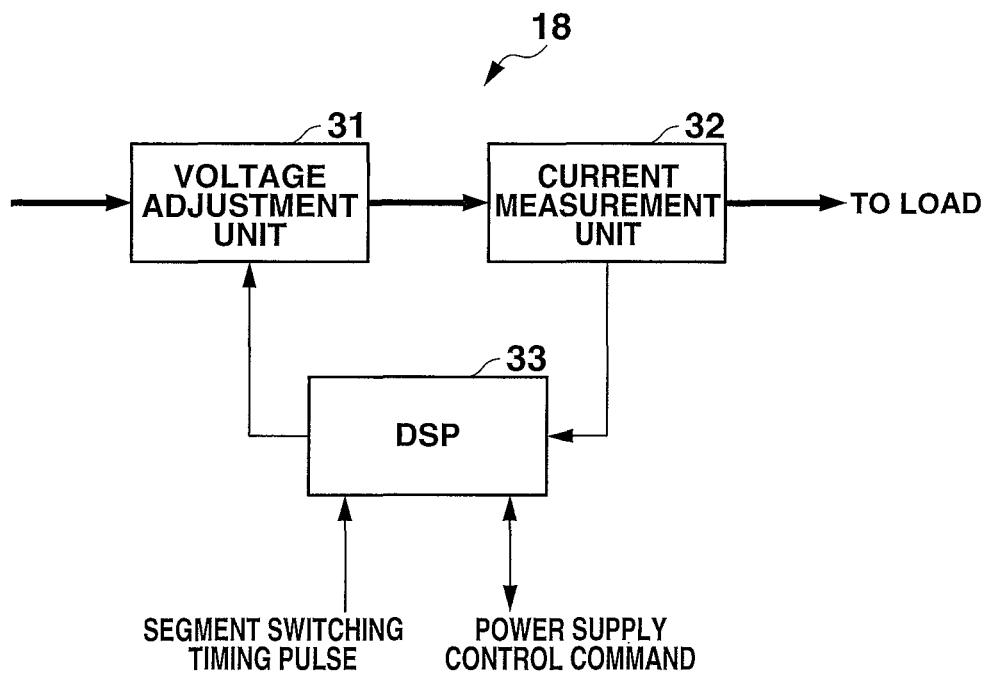
FIG. 2 is a block diagram showing the internal circuit arrangement of a digital power supply in FIG. 1 according to the first embodiment.

FIG. 2 shows the arrangement of a portion, of the digital power supply 18, which drives the light source unit 15. That is, in the digital power supply 18, a voltage adjustment unit 31 as a driving unit adjusts a voltage to be applied to the light source unit 15. A current measurement unit (current detection unit) 32 as a detection unit measures (or detects) the current value (light source current value) of power with the adjusted voltage in the process of being supplied to an LED as a load in the light source unit 15. The measurement result obtained by the current measurement unit 32 is fed back to a digital signal processor (DSP) 33 serving as a setting unit, a calculation unit, a storage unit, and a determination unit. The DSP 33 executes feedback control on a current value flowing in the light-emitting element driven at this time point by the segment switching timing pulse and power supply control command supplied from the projection processing unit 13 described above, thereby adjusting a voltage value in the voltage adjustment unit 31 described above.

The CPU 19 controls all the operations of the respective circuits described above. The CPU 19 is directly connected to a main memory 20 and a program memory 21. The main memory 20 is formed from, for example, an SRAM, and functions as a work memory for the CPU 19. The program memory 21 is formed from an electrically programmable nonvolatile memory, and stores operation programs executed by the CPU 19, various types of fixed-form data, and the like. In other words, the CPU 19 executes a control operation in the projector apparatus 10 by using the main memory 20 and the program memory 21 described above.

The CPU 19 executes various types of projection operations in accordance with key operation signals from an operation unit 22.

The operation unit 22 includes a key operation unit provided on the main body of the projector apparatus 10 and an infrared light receiving unit which receives infrared light from a remote controller (not shown) dedicated to the projector apparatus 10, and directly outputs, to the CPU 19, the key operation signal based on the keys operated by the user with the key operation unit of the main body or the remote controller.

The CPU 19 is further connected to an audio processing unit 23 via the system bus SB. The audio processing unit 23 includes a sound source circuit such as a PCM sound source. The audio processing unit 23 converts audio data supplied via the system bus SB at the time of a projection operation into analog data, and drives a loudspeaker unit 24 to amplify and output the audio or cause the loudspeaker unit 24 to generate a beep sound, as needed.

Figure 3:
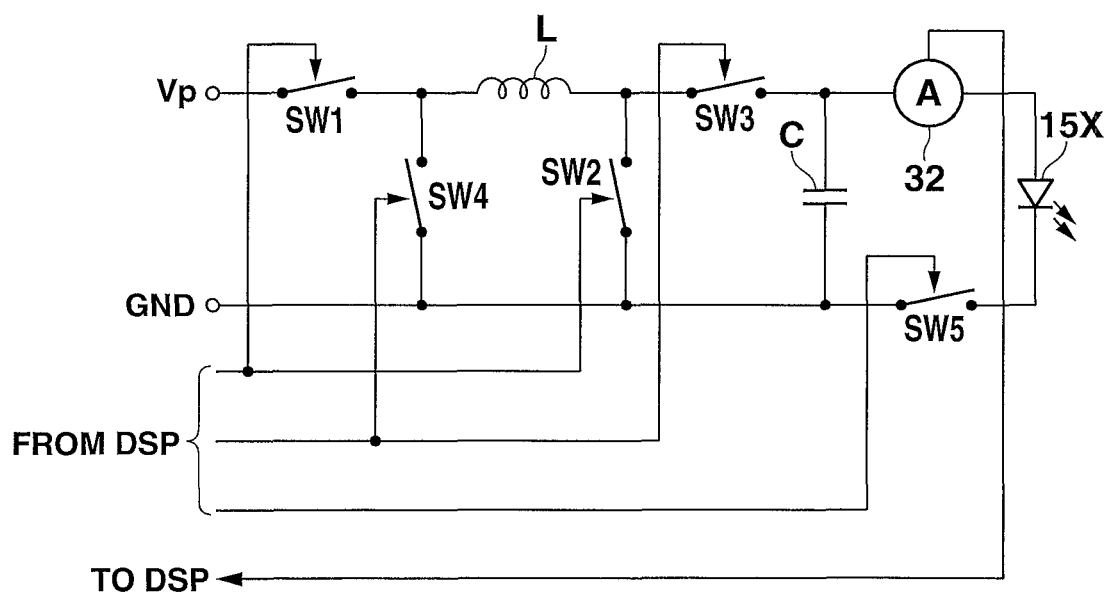
FIG. 3 is a circuit diagram showing the arrangement of a basic model of the electric circuit of a digital power supply and a light source unit as a drive target of the power supply according to the first embodiment.

FIG. 3 shows the arrangement of a basic model of the electric circuit of the digital power supply 18 and the light source unit 15 as a drive target of the power supply. A power supply voltage Vp is applied to one terminal of a switch SW4 which is a normally open contact with the other terminal grounded and one terminal of an inductance L via a switch SW1 which is a normally open contact (a contact which is normally open). The other terminal of the inductance L is connected to one terminal of a switch SW2 which is a normally open contact with the other terminal grounded and one terminal of a switch SW3 which is also a normally open contact. The other terminal of the switch SW3 is connected to one terminal of a capacitor C with the other terminal grounded, and is also connected to the cathode of an LED 15X as a drive target via an ammeter forming the current measurement unit 32 described above. The anode of the LED 15X is connected to one terminal of a switch SW5 which is a normally open contact with the other terminal grounded.

In this case, the LED 15X is obtained by modeling each LED, in the light source unit 15, which emits primary color light of R, G, or B. Although LEDs of the respective colors differ in set voltage, they have similar circuit arrangements.

Each of the switches SW1 to SW5 is ON/OFF-controlled by an operation signal from the DSP 33. While the switches SW1 and SW2 operate synchronously, the switches SW3 and SW4 operate synchronously. The measurement value obtained by the ammeter of the current measurement unit 32 is sent to the DSP 33.

An operation of the above embodiment will be described next.

Figure 4:
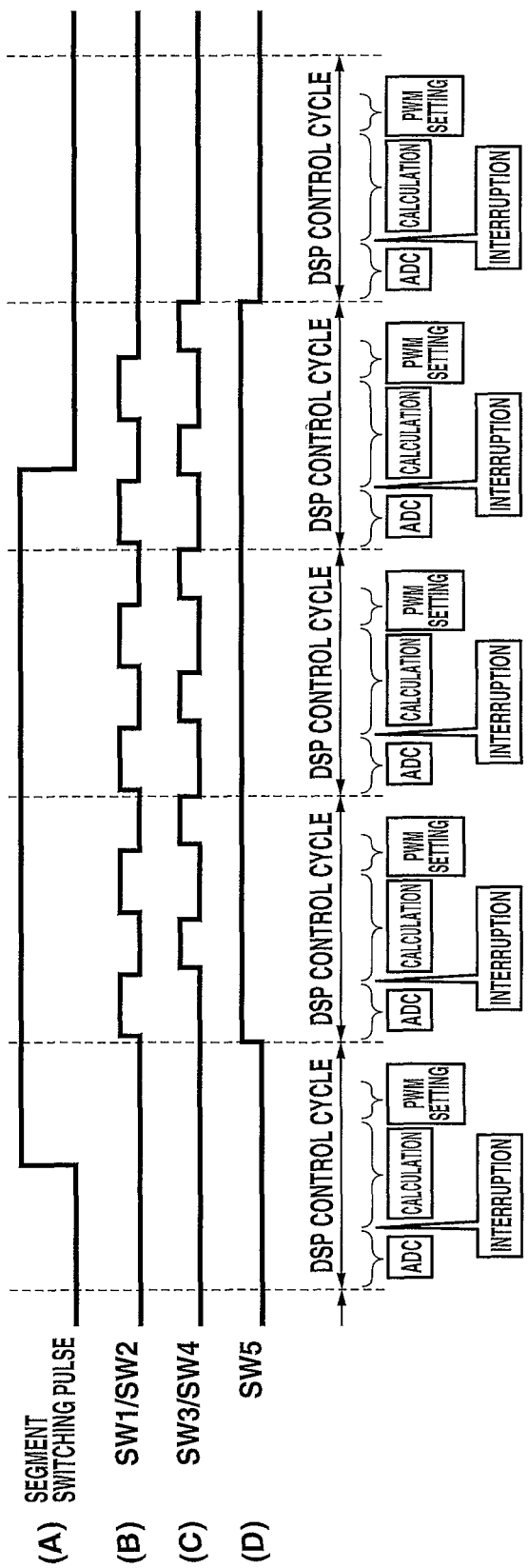
FIG. 4 is a timing chart showing the contents of control by a DSP with respect to the circuit in FIG. 3 according to the first embodiment.

FIG. 4 is a timing chart showing the control processing timing of the DSP 33 with respect to the model circuit in FIG. 3 described above. Referring to FIG. 4, (A) indicates a temporally enlarged segment switching pulse applied from the projection processing unit 13 at the start timing of each segment to switch between the respective color segments constituting one frame of a color image, for example, R, G, B, Ye, Mg, and Cy segments. The DSP 33 sets a control cycle with a period of about several μs, which is sufficiently shorter than the width of this segment switching pulse. In one control cycle, although described in detail later, the DSP 33 performs "output value measurement ("ADC")" from current measurement unit 32" processing, "duty calculation by filter calculation ("calculation")" processing, and "duty setting ("pulse width modulation (PWM) setting")" based on voltage adjustment by PWM driving" processing, and accepts "interruption" processing at a timing between the above "ADC" processing and "calculation" processing.

The processing span in FIG. 4 is sufficiently shorter than the time span of processing (each period) described later with reference to FIG. 6.

In the first control cycle after the leading edge of the segment switching pulse indicated by (A) in FIG. 4, the DSP 33 controls operation signals indicated by (B) in FIG. 4 for the switches SW1 and SW2 and operation signals indicated by (C) in FIG. 4 for the switches SW3 and SW4 in the manner shown in FIG. 4, and keeps turning on an operation signal indicated by (D) in FIG. 4 for the switch SW5 to light the LED 15X. During this period, the DSP 33 repeats the "output value measurement" processing, the "duty calculation" processing, and "PWM setting" processing described above in accordance with the control cycle, thereby executing feedback control for the duty (manipulative variable) of PWM control based on an output value and making the output value converge to a targeted value.

In the first control cycle after the trailing edge of the segment switching pulse indicated by (A) in FIG. 4, the DSP 33 turns off each of the operation signals for the switches SW1 to SW5, as indicated by (B), (C), and (D) in FIG. 4, to stop the above feedback control until the next segment is set in a driven state.

Control processing executed by the DSP 33 will be described in detail next.

Figure 5:
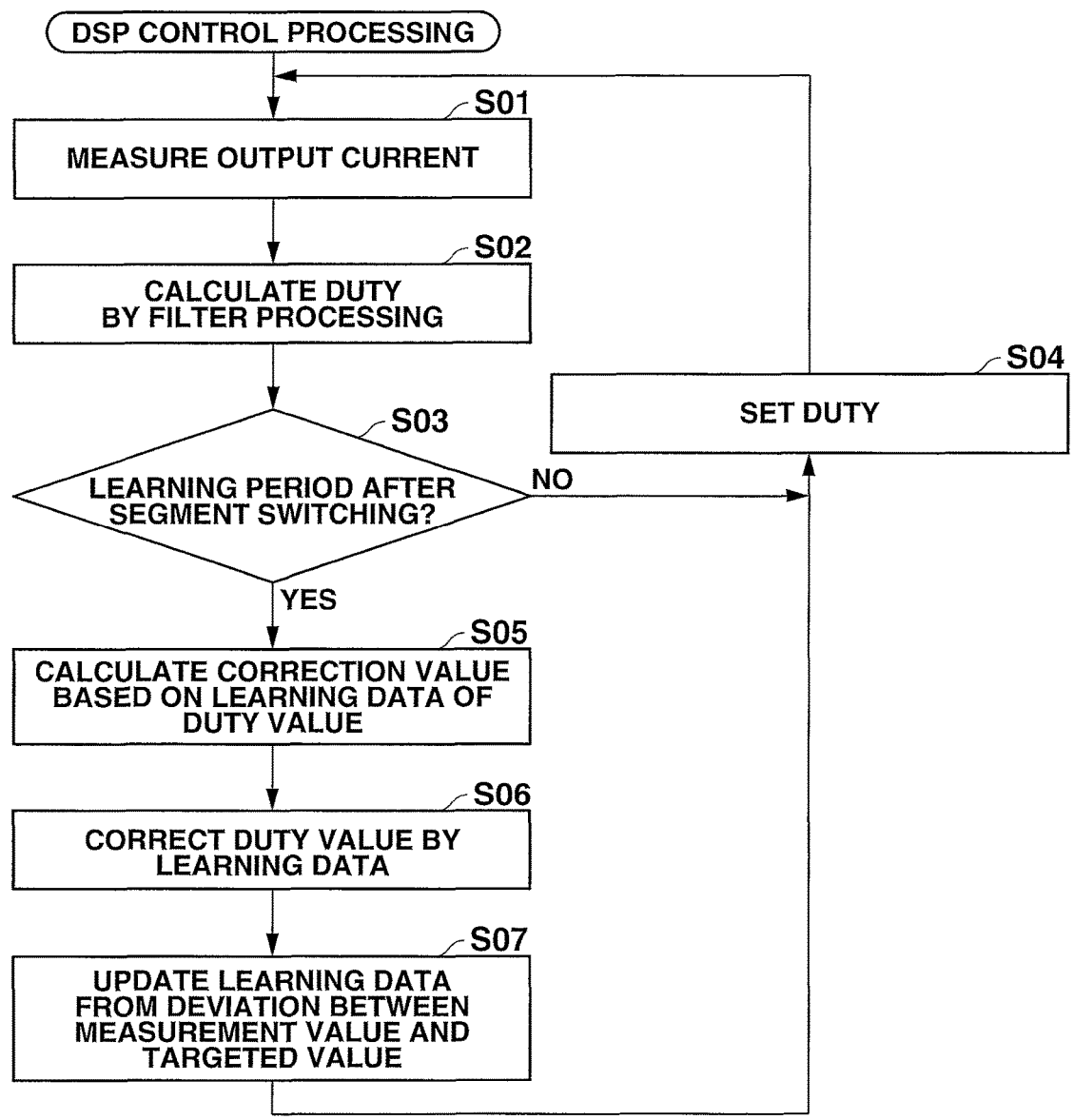
FIG. 5 is a flowchart showing the contents of processing at the time of feedback control executed by the DSP according to the first embodiment.

FIG. 5 is a flowchart showing the contents of processing at the time of feedback control executed by the DSP 33.

Note that the DSP 33 stores in advance measurement values, in the each color segment constituting one frame of a color image, obtained from past several to several ten frames immediately before a corresponding color segment as a learning period ("learning lighting" period to be described later).

As described above, the DSP 33 causes, for example, the current measurement unit 32 to measure the value of output power at the start of a control cycle in the above manner (step S01), and acquires the measurement value. The DSP 33 then calculates the duty ratio of PWM control by filter processing based on the acquired measurement value (step S02).

After the calculation, the DSP 33 determines whether the corresponding time point falls within a learning period in a control cycle count set in advance immediately after segment switching (step S03).

Upon determining that the time point does not fall within this learning period, the DSP 33 performs a driving operation by setting the duty ratio obtained by the calculation in immediately preceding step S02 (step S04). The DSP 33 then terminates the processing in this control cycle, and returns to the processing from step S01 to shift to the next control cycle.

Upon determining in step S03 that the time point falls within this learning period, the DSP 33 calculates and adds, to the duty ratio obtained by calculation using filter processing, the following correction data with consideration given to a learning period count for each segment and each light source element (steps S05 and S06).

If, for example, this correction data (learning data) is given as $$\text{Adj.}[x][seg][i]$$

(where x is a light source element (R, G, B), seg is a segment (R, G, B, Ye, Mg, Cy), and i is a control count value (cycle count) immediate after switching then, the DSP 33 corrects the duty ratio by the value represented by Adj.[x][seg][i] described above, and updates the learning data (step S07).

For example, a method of updating this learning data is as follows:

[learning coefficient(learning constant,parameter)]×
([targeted value]−[measurement value (detection value)]) is added to $$\text{Adj.}[x][seg][i-\alpha]$$

(where α is a delay time (depending on a hardware configuration) from when a duty is set by PWM to when a waveform changes)

Subsequently, the DSP 33 drives the driving circuit upon setting the corrected duty ratio (step S04), and terminates the processing in this control cycle. The DSP 33 then returns to the processing from step S01 described above to shift to the next control cycle.

[First Mode of Method of Calculating Learning Data]

It is conceivable that the quality of a projected image is influenced more when output power from a light source exceeds a targeted value than when the output power falls short of the targeted value. It is therefore possible to shorten the time during which the output power exceeds the targeted value by setting a larger [learning coefficient] when the output power exceeds the targeted value than when the output power falls short of the targeted value.

[Second Mode of Method of Calculating Learning Data]

It is possible to provide a general expression by, for example, using a function f instead of the multiplication using [learning coefficient] like that described above in the following manner:

[next learning data$[i-\alpha]$]=f([previous learning data
[i]],[targeted value],[measurement value])

In addition, learning data may be changed during control depending on other factors (a time (a period count) from the start of control, a temperature, . . . ) as expressed as follows:

[next learning data$[i-\alpha]$]=f([previous learning data
[i]],[targeted value],[measurement value],time
(period count) from start of control, temperature, . . . )

This is equivalent to changing the [learning coefficient] described above during control.

[Third Mode of Method of Calculating Learning Data]

Since the delay time α rarely becomes an integer multiple of the period of a control cycle, it is conceivable to update learning data a plurality of times as expressed as follows:

[next learning data$[i-\alpha]$]=f([previous learning data
[i]],[targeted value],[measurement value])

[next learning data$[i-\alpha-1]$]=g([previous learning
data[i]],[targeted value],[measurement value])

[Fourth Mode of Method of Calculating Learning Data]

Changes in output power influence image quality most in an early stage of lighting in which the light source element changes from the OFF state to the ON state. In order to simplify the control, therefore, it is conceivable to perform learning for only a predetermined time in the early stage of lighting.

In this case, it is not possible to learn changes caused by the switching ON/OFF of another light source element sharing the power supply during lighting or differences in drive tendency between different segments when the same light source element changes from the OFF state to the ON state. However, performing control accurately at the timing when changes in output power influence image quality most can greatly contribute to an improvement in image quality while reducing the load required for arithmetic processing by the DSP 33.

A processing schedule with consideration given to the calculation time taken by the DSP 33 will be described next.

Since the DSP 33 executes the above feedback control in a very short period, it is necessary to consider the computation amount of the DSP 33 in comparison with the control period.

In general, the computation amount of the DSP is represented by the following relationship:

[lighting period in learning control]>[lighting period
in normal control]>[non-lighting period]

It is therefore possible to avoid an unnecessary increase in the computation amount of the DSP 33 for learning by calculating and updating learning data in a period in which there is a relatively small amount of processing to be performed by the DSP 33 during a non-lighting period.

Figure 6:
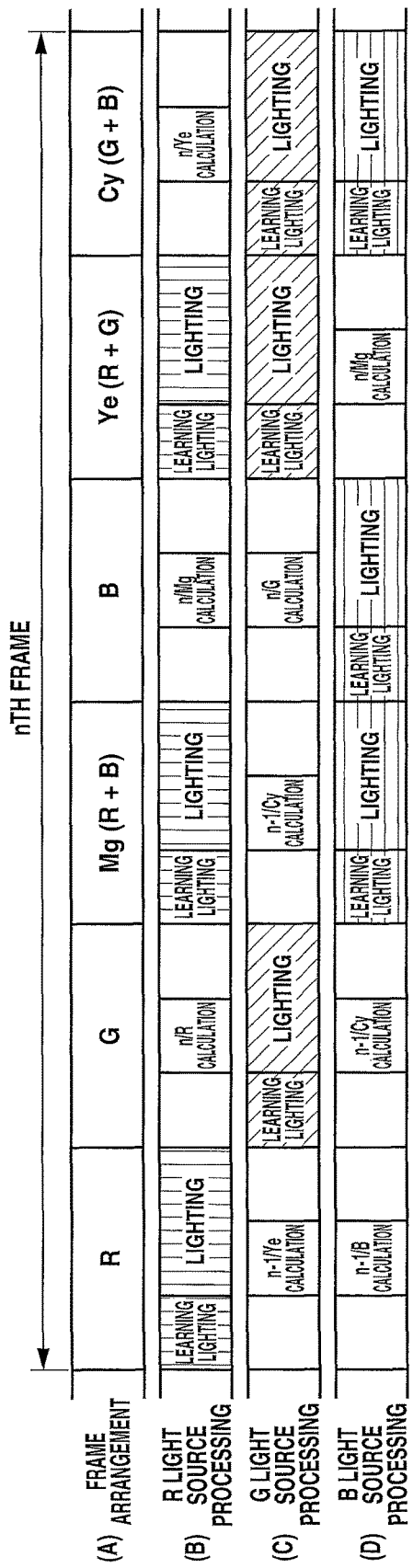
FIG. 6 is a timing chart showing the contents of processing executed by the DSP according to the first embodiment.

FIG. 6 is an example of a timing chart showing the contents of processing executed by the DSP 33 in the nth frame when one frame of a color image is constituted by a total of six segments (fields), namely R, G, Mg, B, Ye, and Cy segments.

Referring to FIG. 6, (A) indicates a segment arrangement in the frame, and (B), (C), and (D) respectively indicate the contents of processing by the DSP 33 with respect to the respective LEDs which emit R, G, and B light beams in the light source unit 15.

In the respective primary color segments of R, G, and B, the R, G, and B LEDs in the light source unit 15 each are lit to emit single-color light. In addition, in each of complementary color segments of Ye, Mg, and Cy, the R, G, and B LEDs in the light source unit 15 are driven as follows. For example, in an Mg segment, the R and B LEDs are lit to simultaneously emit light beams of two colors.

Referring to FIG. 6, in (B), (C), and (D), a "learning lighting" period indicates a period in which lighting is performed based on a manipulative variable controlled by the above learning control. In this period, the current calculated in an "n/seg calculation" period is measured and stored.

A "lighting" period indicates a period in which the LED is lit based on a manipulative variable to be controlled by normal control (feedback control in a short period (for example, proportional integral derivative (PID) control, or the like).

In addition, an "n/seg calculation" period ("calculation" period) indicates a period in which correction data used for control in the next "learning lighting" period is calculated (updated and set) based on the current value measured and stored in a "learning lighting" period in a seg segment in the nth frame.

As described above, referring to FIG. 6, the above "lighting period in learning control" with a heavy processing load is executed by being divided into the "learning lighting" period and the "n/seg calculation" period.

That is, in each lighting segment, when the "learning lighting" period, which is a predetermined period in an early stage of lighting, ends after the DSP 33 measures and stores output power in the above manner, the DSP 33 sets the duty ratio calculated by filter processing as that for normal lighting driving, and shifts to normal lighting driving ("lighting" period).

In addition, in each non-lighting segment, to prepare for the next lighting segment, the DSP 33 executes calculation and updating ("n/seg calculation") based on a measurement value during the "learning lighting" period in the lighting segment, which has been stored so far, at a timing avoiding "learning lighting" periods in other light source processing.

For example, as indicated by (B) in FIG. 6, with regard to processing for driving the R LED in the light source unit 15, the R, Mg, and Ye segments are lighting segments, and the G, B, and Cy segments immediately after the lighting segments are non-lighting segments.

For this reason, in the nth frame, the DSP 33 calculates the current measurement value stored in an immediately preceding lighting segment at a timing avoiding "learning lighting" periods in other light source processing in the next non-lighting segment to update and set the data.

In addition, as indicated by, for example, (D) in FIG. 6, with regard to processing for driving the B LED in the light source unit 15, the Mg, B, and Cy segments are lighting segments, and the R, G, and Cy segments are non-lighting segments.

For this reason, in the first R and G segments in the frame, the DSP 33 calculates the power measurement values stored in the B and Cy segments in the immediately preceding (n−1)th frame at a timing avoiding "learning lighting" periods in other light sources to update and set the data. In the Ye segment, the DSP 33 then calculates the current measurement value stored in the Mg segment in the nth frame at a timing avoiding "learning lighting" periods in other light source processing to update and set the data.

In this manner, the heavy arithmetic processing by the DSP 33 is distributed so as to perform calculation and setting processing at a timing avoiding "learning lighting" periods in other light source processing in non-lighting segments, thereby averaging the arithmetic processing by the DSP 33. This makes it possible to implement proper control without imposing any unnecessary load on the DSP 33.

Figure 7:
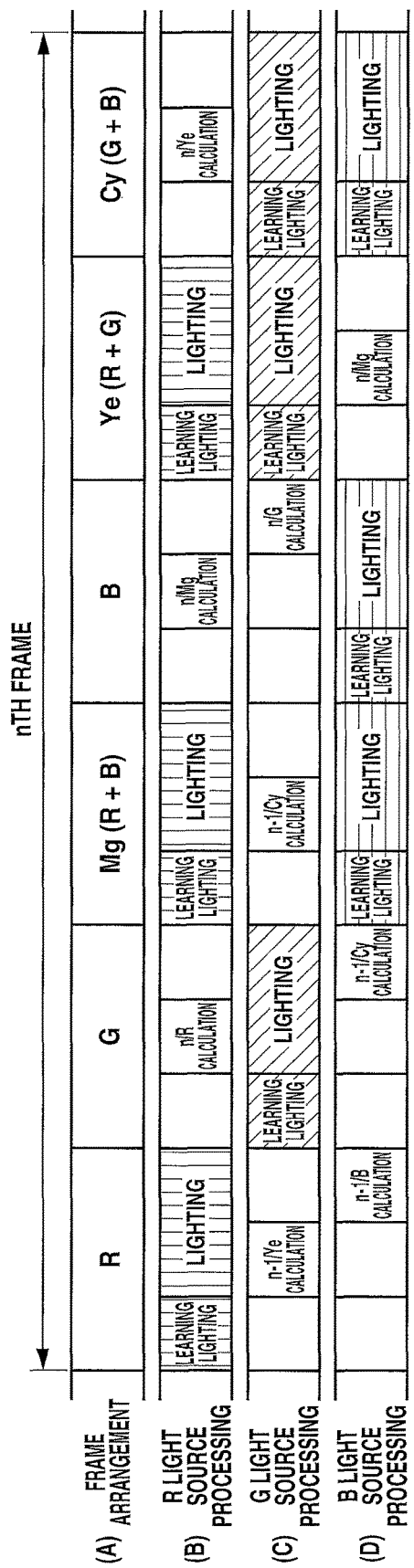
FIG. 7 is another timing chart showing the contents of processing executed by the DSP according to the first embodiment.

In addition, as shown in FIG. 7, each "n/seg calculation" period ("calculation" period) itself in light source processing may be set so as not to overlap any "n/seg calculation" periods in other light source processing.

This makes it possible to further average the arithmetic processing by the DSP 33.

Furthermore, as described above, correction data is managed and subjected to storage/determination control for each light source and each segment in the form of Adj.[x][seg][i]. This makes it possible to easily and properly perform control.

FIG. 8 is a timing chart showing, in a simplified form, processing by the DSP 33 over a plurality of frames. As described above, the DSP 33 has correction data calculated for each light source element, each segment, and each control cycle from a lighting start timing. For example, the value measured in a second control cycle t1 from the lighting start timing in the Mg segment in the nth frame and the value measured in a second control cycle t2 from the lighting start timing in the Mg segment in the next (n+1)th frame, indicated by (C) in FIG. 8, are fed back, as data measured for the same light source, the same segment, and the same control cycle, to the next (n+2)th frame and subsequent frames.

FIG. 9 shows the basic concept of the above feedback control. For example, with regard to processing for a given light source element in the nth frame, assume that when control is executed in the control cycle indicated by timing t11 in FIG. 9, the waveform changes in the control cycle indicated by succeeding timing t12.

In this case, the waveform difference in the control cycle at timing t12 is set as a deviation, and the correction data used in the control cycle at preceding timing t11 is corrected in accordance with the deviation.

In the same segment in processing for the same light source element in the next (n+1)th frame, therefore, correcting a control value in the control cycle indicated by timing t21 in FIG. 9 in consideration of the above deviation will correct the waveform in the control cycle indicated by succeeding timing t22.

The following is a comparison based on experimental results between a case in which learning is performed for each same light source element, each same segment, and each same control cycle by tracing back to a plurality of frames in the past and a case in which such learning is not performed.

Comparative Example

FIG. 10 exemplarily shows the waveform of a current value immediately after the start of lighting of an LED as a light source element when only feedback control (control corresponding to conventional PID control) is executed in a short period without the above learning. In this case, "1" indicates a segment switching pulse, and "4" indicates the output current value of the LED. When the energization of an LED as a light source element starts in synchronism with a control cycle immediately after the leading edge of a segment switching pulse, a large overshoot appears, and it takes about 120 µs to make the current value converge to a predetermined current value.

Example

In contrast to this, FIG. 11 exemplarily shows the waveform of a current value immediately after the start of lighting of an LED as a light source element when learning control in the present invention is performed. In this case as well, "1" indicates a segment switching pulse, and "4" indicates the output current value of the LED. Note that each waveform in FIG. 11 corresponds to a time axis four times larger than the time axis (abscissa) in FIG. 10. When the energization of an LED as a light source element starts in synchronism with a control cycle immediately after the leading edge of a segment switching pulse, no overshoot or the like appears in particular, and it takes about 12 µs to make the current value converge to a predetermined current value.

It is possible to greatly reduce changes caused immediately after a change from the OFF state to the ON state by performing learning for each same light source element, each same segment, and each same control cycle over several to several ten frames in the past and reflecting the resultant value in a correction value. This can greatly reduce the pulsation generated when the digital power supply 18 drives the light source unit 15.

As described in detail above, according to this embodiment, it is possible to greatly reduce the pulsation generated when a physical quantity (voltage or current) as a controlled object changes.

In addition, according to the above embodiment, since the DSP 33 stores a deviation at a timing, as a learning period, when a physical quantity which periodically changes stepwise, it is possible to reliably suppress pulsation which tends to be generated by steep changes in load.

In this case, in particular, pulsation occurs more easily during a driving operation immediately after the ON state when the power supplied to the load changes from the OFF state to the ON state than when the power changes from the ON state to the OFF state. For this reason, it is possible to reliably suppress pulsation while minimizing the load on the DSP 33 by executing the above control only at the leading edge timing of power.

In the above embodiment, as described in the first to third modes associated with the method of calculating learning data, since a learning coefficient used for calculation is used for correction after being adjusted as a parameter, it is possible to more reliably suppress the pulsation.

In addition, it is possible to implement more efficient feedback by incorporating a series of controls performed by the DSP 33 described above within a PID control system on which a general feedback technique is based.

Although the above embodiment has exemplified the case in which a light-emitting element is driven as a load, the present invention can also be applied to a load other than a light-emitting element. For example, the present invention can be suitably applied to speed control of a motor which periodically changes in rotational speed.

The present invention is not limited to the above embodiment, but can be variously modified within a range not departing from the gist of the invention. In addition, the above embodiment includes inventions of various stages, and various inventions can be extracted by proper combinations of a plurality of disclosed constituent elements. For example, even when some constituent elements are removed from all the constituent elements disclosed in each embodiment or some of the constituent elements are combined in a different form, the structure in which the constituent elements are removed or combined can be extracted as an invention when it can solve the problem and can obtain effects.

What is claimed is:

1. A driving apparatus which drives a load so as to periodically change a physical quantity as a controlled object, the apparatus comprising:
   a setting unit configured to set a targeted value of the physical quantity;
   a detection unit configured to detect a present value of the physical quantity;
   a calculation unit configured to calculate a deviation between the targeted value and a detection value detected by the detection unit;
   a storage unit configured to store past deviations calculated by the calculation unit;
   a determination unit configured to determine a manipulative variable corresponding to the physical quantity, by referring to a past deviation before a predetermined period, which has been stored in the storage unit; and
   a driving unit configured to drive the load, based on the manipulative variable determined by the determination unit,
   wherein the storage unit and the determination unit are added to a proportional integral derivative (PID) control system using the setting unit, the detection unit, and the calculation unit.

2. The apparatus according to claim 1, wherein the storage unit stores a deviation at a timing when the physical quantity changes stepwise.

3. The apparatus according to claim 2, wherein the storage unit stores a deviation at a timing when the physical quantity increases stepwise.

4. The apparatus according to claim 1, wherein the determination unit determines the manipulative variable by adjusting a parameter used for calculation.

5. The apparatus according to claim 1, wherein the load includes a plurality of types of loads, the storage unit stores past deviations for each load, and the determination unit determines a manipulative variable corresponding to the physical quantity for each load.

6. A driving apparatus which drives a load so as to periodically change a physical quantity as a controlled object, the apparatus comprising:
   a setting unit configured to set a targeted value of the physical quantity;
   a detection unit configured to detect a present value of the physical quantity;
   a calculation unit configured to calculate a deviation between the targeted value and a detection value detected by the detection unit;
   a storage unit configured to store past deviations calculated by the calculation unit;
   a determination unit configured to determine a manipulative variable corresponding to the physical quantity, by referring to a past deviation before a predetermined period, which has been stored in the storage unit; and a driving unit configured to drive the load, based on the manipulative variable determined by the determination unit, wherein an interval during which the load is not driven is included in a cycle, and the determination unit determines a manipulative variable corresponding to the physical quantity in the interval during which the load is not driven.

7. The apparatus according to claim 6, wherein the storage unit stores a deviation at a timing when the physical quantity changes stepwise.

8. The apparatus according to claim 7, wherein the storage unit stores a deviation at a timing when the physical quantity increases stepwise.

9. The apparatus according to claim 6, wherein the determination unit determines the manipulative variable by adjusting a parameter used for calculation.

10. The apparatus according to claim 6, wherein the load includes a plurality of types of loads, the storage unit stores past deviations for each load, and the determination unit determines a manipulative variable corresponding to the physical quantity for each load.

11. A driving apparatus which drives a load so as to periodically change a physical quantity as a controlled object, the apparatus comprising:
- a setting unit configured to set a targeted value of the physical quantity;
- a detection unit configured to detect a present value of the physical quantity;
- a calculation unit configured to calculate a deviation between the targeted value and a detection value detected by the detection unit;
- a storage unit configured to store past deviations calculated by the calculation unit;
- a determination unit configured to determine a manipulative variable corresponding to the physical quantity, by referring to a past deviation before a predetermined period, which has been stored in the storage unit; and
- a driving unit configured to drive the load, based on the manipulative variable determined by the determination unit, wherein the determination unit determines a manipulative variable corresponding to the physical quantity of each load at a timing that does not overlap determination of a manipulative variable corresponding to the physical quantity of another load.

12. The apparatus according to claim 11, wherein the storage unit stores a deviation at a timing when the physical quantity changes stepwise.

13. The apparatus according to claim 12, wherein the storage unit stores a deviation at a timing when the physical quantity increases stepwise.

14. The apparatus according to claim 11, wherein the determination unit determines the manipulative variable by adjusting a parameter used for calculation.

15. The apparatus according to claim 11, wherein the load includes a plurality of types of loads, the storage unit stores past deviations for each load, and the determination unit determines a manipulative variable corresponding to the physical quantity for each load.

16. A driving method of driving a load so as to periodically change a physical quantity as a controlled object, the method comprising:
- setting a targeted value of the physical quantity;
- detecting a present value of the physical quantity;
- calculating a deviation between the targeted value and a detection value obtained in the detection;
- storing past deviations calculated in the calculation;
- determining a manipulative variable corresponding to the physical quantity, by referring to a past deviation before a predetermined period, which has been stored in the storing; and
- driving the load, based on the manipulative variable determined in the determination, wherein the storing and the determining are performed by a proportional integral derivative (PID) control system which performs the setting, the detecting, and the calculating.

17. A driving method of driving a load so as to periodically change a physical quantity as a controlled object, the method comprising:
- setting a targeted value of the physical quantity;
- detecting a present value of the physical quantity;
- calculating a deviation between the targeted value and a detection value obtained in the detection;
- storing past deviations calculated in the calculation;
- determining a manipulative variable corresponding to the physical quantity, by referring to a past deviation before a predetermined period, which has been stored in the storing; and
- driving the load, based on the manipulative variable determined in the determination, wherein an interval during which the load is not driven is included in a cycle, and the determining determines a manipulative variable corresponding to the physical quantity in the interval during which the load is not driven.

18. A driving method of driving a load so as to periodically change a physical quantity as a controlled object, the method comprising:
- setting a targeted value of the physical quantity;
- detecting a present value of the physical quantity;
- calculating a deviation between the targeted value and a detection value obtained in the detection;
- storing past deviations calculated in the calculation;
- determining a manipulative variable corresponding to the physical quantity, by referring to a past deviation before a predetermined period, which has been stored in the storing; and
- driving the load, based on the manipulative variable determined in the determination, wherein the determining determines a manipulative variable corresponding to the physical quantity of each load at a timing that does not overlap determination of a manipulative variable corresponding to the physical quantity of another load.

* * * * *